Aug. 20, 1935.　　　　　C. E. MAYNARD　　　　　2,011,685
METHOD AND APPARATUS FOR MIXING AND BLENDING RUBBER COMPOUNDS
Filed Sept. 11, 1931

INVENTOR.
BY CHARLES EDGAR MAYNARD
ATTORNEY.

Patented Aug. 20, 1935

2,011,685

UNITED STATES PATENT OFFICE 2,011,685

METHOD AND APPARATUS FOR MIXING AND BLENDING RUBBER COMPOUNDS

Charles Edgar Maynard, Northampton, Mass., assignor, by mesne assignments, to The Fisk Rubber Corporation, a corporation of Delaware Application September 11, 1931, Serial No. 562,292

6 Claims. (Cl. 18—2)

This invention relates to an improved method of milling or mixing rubber or rubber compounds and apparatus for carrying out the method. The invention is more particularly concerned with the blending and mixing of rubber batches into finished stock or in warming or plasticizing rubber compounds preparatory to using the finished stock for forming inner tubes, tire treads, etc., altho, as will be apparent, it has a general utility wherever the working of rubber batches is of advantage in conditioning the rubber for further manufacturing operations.

One object of the invention is the provision of means whereby a larger batch of rubber can be worked, blended or mixed and still maintain a relatively small rolling "bank" on the mill rolls. A further object is the securing of a greater degree of automatic control permitting an operator to attend a number of mills thereby attaining greater efficiency and economies in operation. The invention also removes or reduces the hazards heretofore attending the operation of a mill where it was necessary for the operator to manually cut or slit the sheet of rubber passing around the front roll of the mill. Other and further objects will be apparent from the following specification and claims.

The use of high speed accelerators of vulcanization and other modern compounding ingredients have led to the use of so-called master batches in many rubber mixers. In rubber working the master batch consists of crude rubber into which has been milled a high concentration of some ingredient such as a very active accelerator. The purpose of the master batch is to insure uniform dispersion throughout the finished rubber mixing of the very small percentage of accelerator. Master batches are also made with coloring pigments, carbon black, etc.

In practice the prescribed amounts of all other compound ingredients are mixed, with the proper amount of broken down rubber, and reclaim if used, into batches known as mixed stock or regular batches. To obtain the finished mix or batch of stock which will be suitable for use in making the finished rubber product the proper amounts of master and regular batches are weighed up and mixed or blended on rubber mixing or grinding mills. The operator hastens the result by repeatedly cutting away some or all of the rubber mass from the front roll thus allowing the bank to run through and a new bank form as the cut portion runs back into the mill. Bank grinding or blending averages the rubber mass and produces uniformity of texture without excessive injury to its fibre. This practice at present, however, is dependent upon the skill and judgment of the operator in controlling the plasticizing and blending of the rubber by the number of times he cuts away the rubber mass and upon his judgment of the size of the relatively small rolling bank maintained on the mill.

In the accompanying drawing which illustrates one embodiment of my invention,

Figure 1:
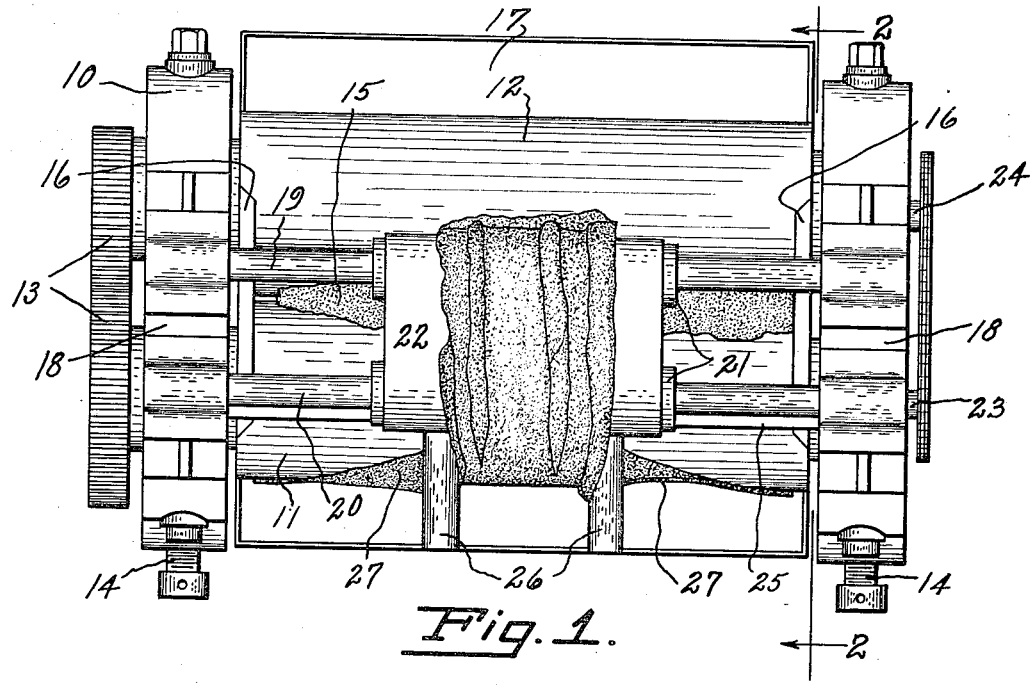
Fig. 1 is a plan view of a mixing mill.

The mill illustrated in the drawing is known in the art as a reducing or warming mill or mixer for rubber and rubber compounds.

Figure 2:
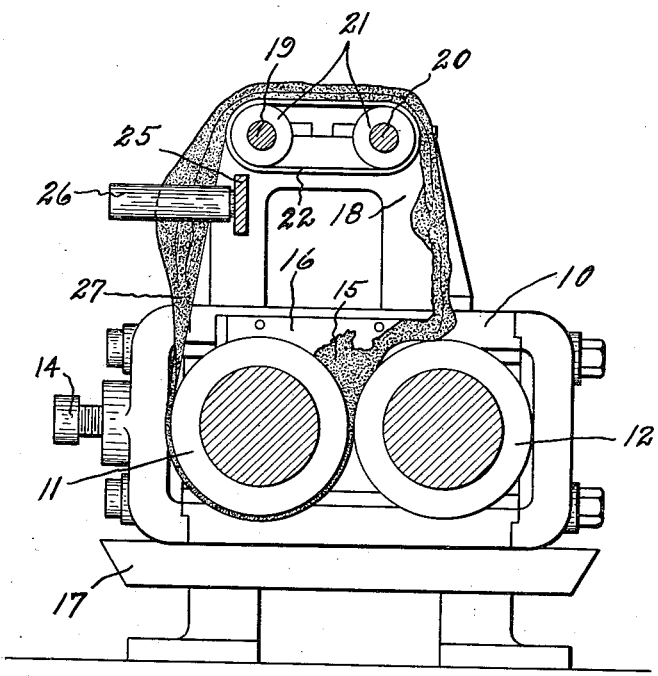
Fig. 2 is an end view thereof, partly in section, substantially on line 2—2 of Fig. 1.

Referring to the drawing, 10 represents a frame upon which are mounted the mixing rolls 11 and 12 adapted to be simultaneously driven in opposite directions by intermeshing gears 13 so that one drives the other, and ordinarily one roll, that to the left as viewed in Fig. 2, is driven at a slower speed than the other. The driving instrumentality for the gears 13, such as an electric motor, is not shown. The distance between the rolls may be varied as desired by adjusting the bearings of roll 11 in any usual and well known manner as by means of screws 14. Guides 16 at both ends of the mill rolls prevent the rubber bank 15 from escaping to the mill pan 17 below without passing between the rolls 11 and 12.

Mounted in suitable bearings supported by brackets 18 attached to the mill frame 19 are shafts 19 and 20 carrying pulleys 21 supporting an endless conveyor belt 22.

Shaft 19 is provided with a sprocket 23 which is driven by a chain passing over a sprocket 24 mounted on the hub of one of the mill rolls 12. The surface speed of the conveyor belt is slightly greater (about 2 or 3%) than the surface speed of the front mill roll 11. Secured to a cross member 25 fixed in the brackets 18 is a pair of spaced, freely rotatable rolls 26.

In operation, after a relatively large bank composed of master and regular batches has been worked on the mill sufficiently to form a sleeve about the forward roll 11 the operator makes a quick cut completely across the sleeve from one edge thereof to the other. The corners of the sheet are folded sufficiently to permit the operator to pass the folded portion of the sheet upwardly between the rollers 26 onto the belt 22 which carries the sheet over the rolls 19 and 20 and allows the sheet to pass downward to the rear mill roll thereby returning it to the bank 15. It will be noted that the rolls 26 are so arranged that they cause a continuous folding of the edges and edge portions of the sheet 27 as it is passed from the roll 11 to the conveyor belt 22 thus transversely condensing the sheet. It has been found that the surface speed of the conveyor belt can be the same as that of the front roll 11 but to insure a faster blending of the mix it is advisable to increase the surface speed of the conveyor belt so it will return the strip of rubber to the bank at a slightly faster rate than it is being taken off the front roll. This gives the strip a sideways weaving action as it is returned to the bank 15 thus maintaining a bank along the entire length of the mill roll. This sideways weaving is due to the increased rate of speed which causes the length of the folded or distorted rubber strip between the delivery end of conveyor 22 and the rear mill roll 11 to increase until the strip falls substantially sideways, then as the length again increases it will fall in the opposite direction. A continuous small rolling bank is thus maintained without the necessity of the operator standing over the mill and repeatedly cutting away the rubber mass from the front roll to allow the bank to run through the roll.

It will be noted that the conveyor belt 22 is located directly over the mill rolls and that through the folding and condensing action of rolls 26 and the "weaving" of the stock back into the rear mill roll a continuous blending and interfolding of a large amount of stock is obtained without any extended travel of the stock from the mill, thus minimizing temperature and other changes in the stock during the milling operation. This arrangement gives a very uniform condition, together with a small rolling bank, which is automatically maintained without any substantial amount of attention from the operator once the operation is started.

In the illustration given the fullest advantage is taken of the improvements afforded by my invention in the blending of the maximum batch of stock but it will be evident that substantial advantages may be secured where the practice here disclosed is followed in part. For example, the folding and condensing of the stock by the rolls 26 may be sufficient under certain conditions without the weaving action afforded by the increased speed of the belt 22 in which case belt 22 may be run at mill speed. Again, where it is desirable to avoid too great a massing of the stock, the rolls 26 may be spaced to minimize their folding and condensing action or they may be omitted altogether and the weaving of the stock onto the rear mill roll used alone. Various alterations such as these are comprehended within the scope of my invention and will be dictated by the nature of the stock and the specific type of milling operation to be performed. The above description will enable the skilled operator to practice the invention with maximum advantage for given conditions with such variations as the given conditions indicate.

Having thus described my invention, I claim:

1. In a rubber mill which includes a pair of mill rolls, a pair of spaced rolls positioned above and at right angles to the mill rolls to receive and transversely condense a sheet of stock formed on the mill rolls, and conveying means to return the so condensed stock to the mill rolls.

2. In a rubber mill which includes a pair of mill rolls, a pair of rolls positioned above and at right angles to the mill rolls to receive and transversely condense a sheet of stock formed on the mill rolls, and conveying means adapted to receive the so condensed stock from the condensing rolls and return it to the mill rolls, the speed of the conveying means being sufficiently greater than the speed of the mill rolls to cause the stock to weave back and forth lengthwise of the mill rolls.

3. In a rubber mill which includes a pair of mill rolls, a conveyor belt positioned above and spaced from the bite of the mill rolls and adapted to receive a sheet of stock from one of the mill rolls and deliver it to the other mill roll, means to transversely condense the sheet of stock as it passes from the first mill roll to the conveyor, and means to cause the stock to weave back and forth lengthwise of the second mill roll as it is delivered to the latter by the conveyor.

4. In a rubber mill which includes a pair of mill rolls, a substantially horizontal conveyor belt positioned above the bite of the mill rolls and adapted to receive a sheet of stock from one of the mill rolls and deliver it to the other mill roll, a pair of spaced rolls positioned intermediate the receiving end of the conveyor and the first mill roll adapted to transversely condense the sheet of stock as it passes to the conveyor, and means for driving the conveyor at a speed sufficiently in excess of the speed of the mill rolls to cause the condensed sheet to weave back and forth lengthwise of the second mill roll as it is delivered to the latter by the conveyor.

5. In a rubber mill which includes a pair of mill rolls between which the rubber passes to be formed into a continuous sheet upon one of said rolls, sheet supporting means spaced above the mill rolls to and over which the rubber sheet is adapted to be passed from the roll upon which it is formed and returned to the bite of the rolls, and spaced members secured in the path of travel of the sheet from the rolls to said sheet supporting means and between which the sheet passes, the space between said members being less than the width of the sheet whereby the latter is transversely condensed before its return to the mill rolls.

6. A method of milling rubber stocks which comprises rolling said stock to sheet form between a pair of mill rolls, leading the sheet away from said rolls, condensing the stock transversely while free of all surface restraint and thereafter rolling the stock into sheet form, all without breaking its continuity.

CHARLES EDGAR MAYNARD.